United States Patent
Sikaffy et al.

[11] Patent Number: 5,814,253
[45] Date of Patent: Sep. 29, 1998

[54] PROCESS FOR MAKING A LIGHTWEIGHT, CEMENTITIOUS, THREE DIMENSIONAL STRUCTURE

[75] Inventors: Faiz Sikaffy, San Pedro Sula, Honduras; Osvaldo Moran, Miami; Eugene Berger, Lake Worth, both of Fla.

[73] Assignee: Thermoflex, Inc., Miami, Fla.

[21] Appl. No.: 403,109

[22] Filed: Mar. 14, 1995

Related U.S. Application Data

[63] Continuation-in-part of Ser. No. 036,700, Mar. 25, 1993, Pat. No. 5,397,516.
[51] Int. Cl.$^6$ .............. B28B 1/50; B28B 1/52; C04B 14/38; C04B 38/00
[52] U.S. Cl. .............. 264/42; 106/672; 106/711; 264/82; 264/211.11; 264/279; 264/333
[58] Field of Search .................. 264/234, 345, 264/42, 333, 336, DIG. 43, 40.1, 40.4, 82, 211.11, 279; 106/672, 711

[56] References Cited

U.S. PATENT DOCUMENTS 5,397,516   3/1995   Sikaffy ........................ 264/42

FOREIGN PATENT DOCUMENTS 2739181   3/1979   Germany ........................ 264/42

Primary Examiner—Karen Aftergut

[57] ABSTRACT

The invention relates to a process of making a light weight, cementitious, three dimensional structure such as a building panel which includes the steps of measuring a quantity of water, measuring about 425 kilograms of cement, and between approximately 40 to 60 grams of ferric chloride in 40% solution by volume per approximately 278 liters of water, mixing the quantity of water, the cement and the ferric chloride, measuring between approximately 0.620 kilograms and 1.347 kilograms of substantially pure powdered aluminum, between approximately 0.230 kilograms and 0.710 kilograms of Hexafluorosilicate, between approximately 0.560 and 0.680 kilograms of calcium formate, and between approximately 4 and 8 kilograms of fiber, per approximately 278 liters of water, combining the mixture of the cement, the ferric chloride and the water with the powdered aluminum, the Hexafluorosilicate, the calcium formate and the fiber, mixing the combination, waiting until the mixed combination rises, and forming the lightweight, cementitious, three dimensional structure.

15 Claims, 2 Drawing Sheets

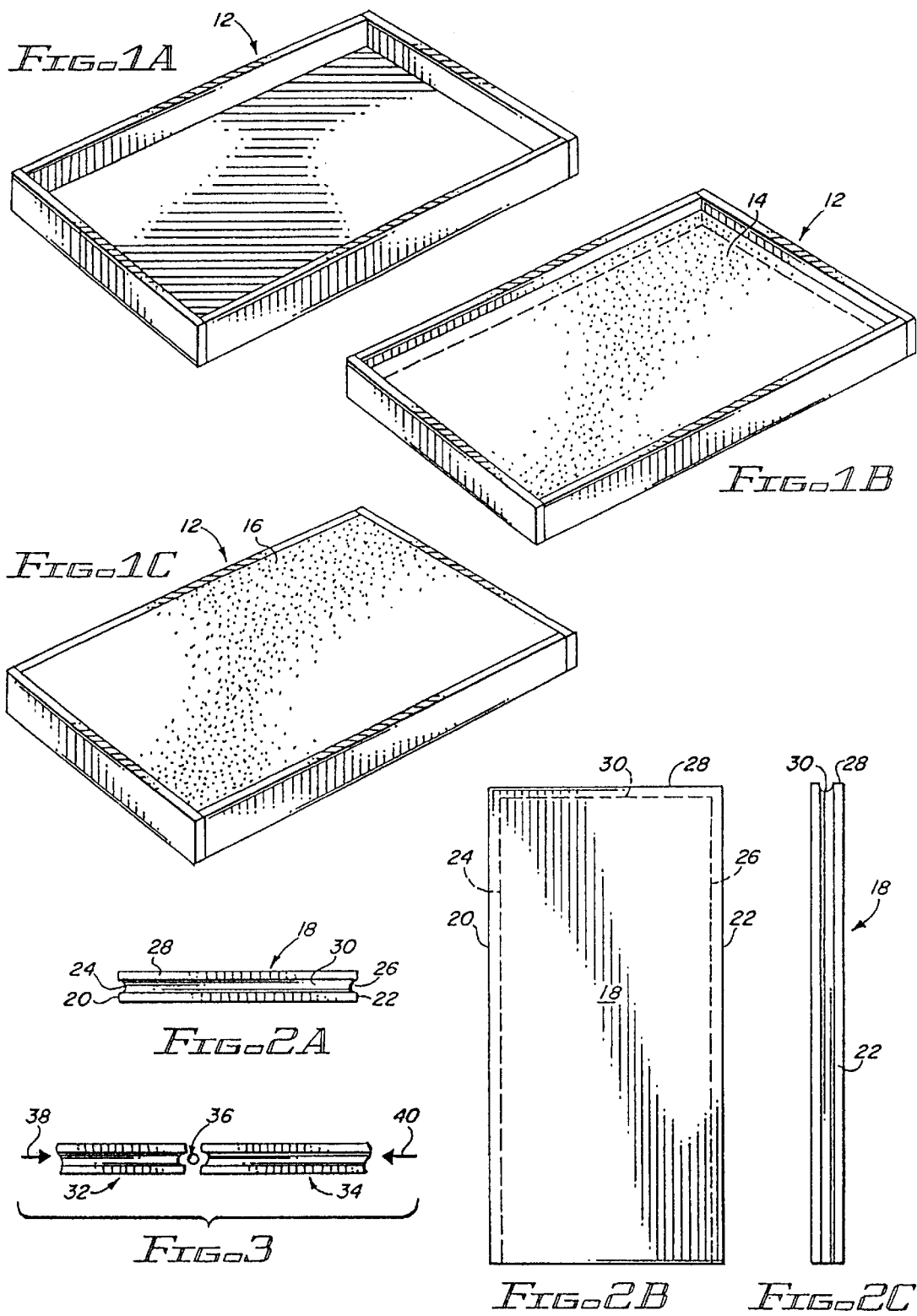

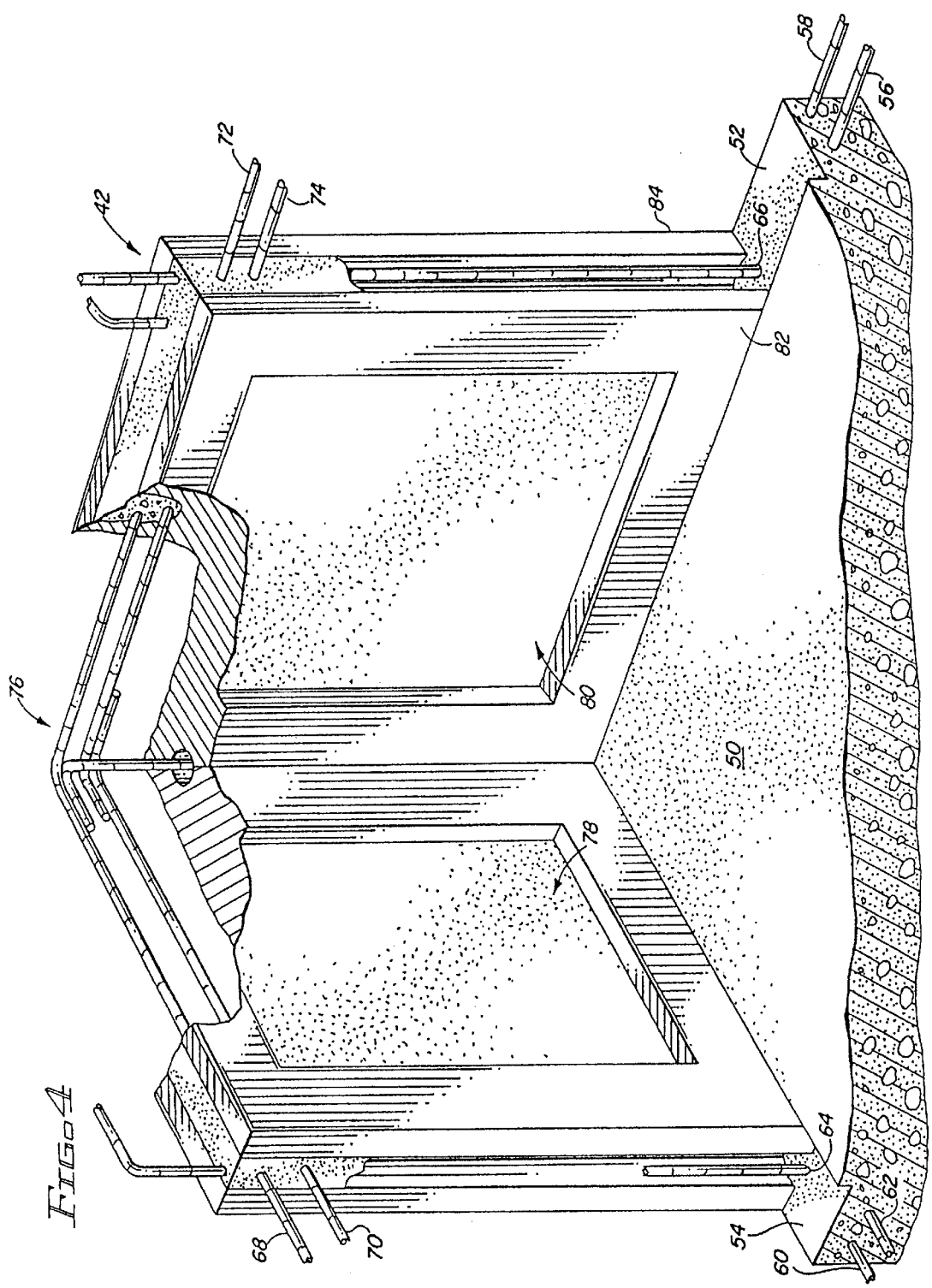

PROCESS FOR MAKING A LIGHTWEIGHT, CEMENTITIOUS, THREE DIMENSIONAL STRUCTURE

BACKGROUND OF THE INVENTION

The present application is a continuation in part of the earlier filed application filed on Mar. 25, 1993 and given Ser. No. 08/036,700, which stands allowed and is set to issue as U.S. Pat. No. 5,397,516 on Mar. 14, 1995.

1. Field of the Invention

This invention is of a method or process of forming a light weight, cementitious, three dimensional structure, and in particular a cementitious building panel which is very strong, yet light in weight, and of a structure or panel made according to the process.

2. Summary of the Invention

In the past, it has been known to form various types of structures, and in particular panels of cementitious material. These panels, which include building wall sections and blocks, are generally utilized to assemble walls for the formation of an overall structure. Some panels formed of such materials are made of a mixture which includes some solid additives as well as Portland cement and synthetic fibers.

This invention in one form is of a process which it has been found produces a cellular cement which is light in weight and highly resistant to impacts. Its structure is formed by spherical cells distributed in the mass of its mixture. Surrounding each cell, a fiber, that is added to the mixture, results in a panel with a very strong flexing strength characteristic. Another important characteristic of the panel according to the process described below is that it has a high thermo resistance with an "R" value of about 3.5 per inch of thickness. It further has the characteristic of high acoustic insulation. It is an excellent fire barrier; and it is light in weight and can be manufactured with a weight preferably of between 22 and 32 pounds per cubic foot. Moreover, a panel according to this invention is highly impermeable to the elements.

BRIEF DESCRIPTION OF THE DRAWINGS

For a fuller understanding of the nature of the present invention, reference should be had to the following detailed description, taken in connection with the accompanying drawings in which:

FIG. 1A is a perspective view of the mold to be used in the preferred embodiment of the present invention;

FIG. 1B is a perspective view of the mold to be used in the preferred embodiment of the present invention upon being initially filled;

FIG. 1C is a perspective view of the mold to be used in the preferred embodiment of the present invention after the mixture therein has risen;

FIG. 2A is a top edge view of a panel formed utilizing the process and mixture of the present invention;

FIG. 2B is a front view of a panel formed utilizing the process and mixture of the present invention;

FIG. 2C is a side edge view of a panel formed utilizing the process and mixture of the present invention;

FIG. 3 is a top edge view of adjacent panels, formed utilizing the process and mixture of the present invention, as used to form a wall section in a structure;

FIG. 4 is a perspective view of a corner section of a structure formed with panels made utilizing the process and mixture of the present invention.

Like reference numerals refer to like parts throughout the several views of the drawings.

DETAILED DESCRIPTION OF THE PREFERRED EMBODIMENT

With the formula to be described hereinafter, and when forming a building panel, a mold or form 12 is preferably used, see FIG. 1A, which is about 4" to 8" in thickness so as to make a panel about 4 feet wide by 4 to 12 feet in height. In performing the process, the ingredients are poured into the mold whereupon in about four hours, the mixture 14 which is only about half of the depth of the mold, see FIG. 1B, expands by about 100% of the original pour volume, or rises to approximately two times its original volume, see FIG. 1C, to form a panel 16. Molds or forms may be utilized to form wall panels or building blocks according to this invention. Gradually, initial adjustments of the pour of the mixture are made so that on completion of the pour expansion phase, the building panels are of uniform and correct size.

The quality control of the process is quite easily attained. When the formula is correct and the mold is filled to substantially one-half the depth of the mold, FIG. 1B, it will be properly filled. If on completion it does overflow or does not fill the form, it is very easy on a quality control basis, to detect a defective panel and reject it.

As an example to further understand the process, when producing one cubic meter of the cementitious mixture of the present invention, a quantity of water, and preferably approximately 278 liters of water, is measured. Also, once measured the water is preferably heated to between 25°–30° centigrade. Similarly, about 425 kilograms of cement, preferably Portland 1 cement, although other grades of Portland cement such as Portland 2 and Portland 3 can be used, and between approximately 40 and 60 grams of Ferric Chloride in a solution of 40% by volume or 40% strength, are also measured and are then mixed with the water. The mixture of water, cement and ferric chloride will preferably be mixed with one another in a high speed mixer for approximately one minute, thereby forming an appropriate mixture of the water, cement, and ferric chloride. Additionally, in an alternative embodiment which provides a more light weight result, a quantity of Sodium Hydroxide is added to the water, cement, and ferric chloride prior to mixing. The sodium hydroxide is preferably added in a 50% solution by volume, but can also be added in solid, flake form. The quantity of sodium hydroxide will preferably be about 5 grams.

Next, a quantity of aluminum, a silicate derivative, a calcium derivative and fiber are measured and mixed with the previously mixed cement, water and ferric chloride. In the preferred embodiment, between approximately 0.620 kilograms and 1.347 kilograms of substantially pure, and preferably 98% pure, powdered aluminum, between approximately 0.230 kilograms and 0.710 kilograms of Hexafluorosilicate, and between approximately 0.560 and 0.680 kilograms of calcium formate are measured mixed. Additionally, between approximately 4 and 8 kilograms of fiber are also measured and mixed. This fiber, which is preferably polypropylene fiber, can be any synthetic, organic or mineral fiber. In the preferred embodiment, this further mixing will be for approximately 20 seconds.

Once the entire combination has been mixed, it is allowed to rise. When forming a molded structure, such as a building panel, the un-risen mixture is poured into molds, preferably filling the molds to only 50% capacity. Once in the molds, usually after waiting approximately 60 minutes, the mixture will rise, increasing its overall volume by 100% and, filling the entire mold. Alternatively, the molds can be filled to a greater or lesser capacity and the waiting time will be corresponding lower or increased to attain 100% filling. The mixture in the filled molds is then allowed to cure, preferably by covering the molds with plastic and steaming for about 2 to 4 hours, after which the formed panel is removed from the molds and used or stored until needed. Further, the mold need not only be a building panel mold, but rather can be any configuration of mold to form any cementitious three dimensional structure.

In an alterative embodiment, the completed mixture is allowed to rise and then poured into an extruding machine which will function to extrude any of a variety of three dimensional structures, as needed. These structures can similarly be immediately used or stored for future use.

Referring now to FIGS. 2A, 2B, and 2C, which illustrate a panel in one preferred configuration or form, it is seen that the panel 18 and, accordingly, the mold in which it is formed is of a rather particular configuration. Along the sides 20 and 22, a centrally located longitudinally extending generally U-shaped groove, see 24 and 26, is defined; and along the upper surface 28, a similar groove 30 is defined. In assembly, a wall section as seen in FIG. 3, is formed by positioning two panels 32 and 34 which have been raised adjacent one another and a steel rod 36 has been positioned centrally between them. The panels are then moved into abutting relation as indicated by the arrowed lines 38 and 40. Thereafter, when the central location of the rod has been secured by wire, as is conventional, a pour of concrete or other suitable material is poured into the tubular cavity surrounding the reinforcing rod 36. This pour forms a labyrinth seal while the steel rod provides reinforcement of the wall.

Referring now to FIG. 4, a construction according to this invention will be described referring to a corner zone of the construction, in this illustration. In an initial summary of this invention, it will be seen that a skeletal framework, generally designated 42, is embedded in concrete and is spanned by building panels according to this invention.

On further reference to FIG. 4, on a concrete slab 50, which may have a peripheral footing, not shown, there is preferably a peripheral lower slab portion, see at 52 and 54. This is about 7⅝" across or about 8". Beneath this portion, steel reinforcing rods, such as 56 and 58 and 60 and 62, are embedded in the concrete of the slab. Also extending upwardly at spaced locations, there are reinforcing rods such as 64 and 66 which in assembly will be steel studs in the center of the U-shaped grooves of adjacent panels, described above.

Along the upper edges of the panels, steel reinforcing rods, such as 68 and 70 and 72 and 74 are arranged. At the corner zone, 76 generally, the ends of the rods are bent into close abutting relation as seen at 76. Preferably, the rods are welded together which in effect defines a skeletal framework of steel reinforcing rods embedded in concrete lengths spanned by cementitious panels such as 78 and 80 in FIG. 4, preferably made according to the process of this invention. To the inside and outside surfaces of the structure thus formed, a suitable facing may be provided as at 82 and 84 which may be drywall on the inside surface and stucco on the outside surface.

Instead of the building panel shown in the drawings, blocks configured with the U-shaped grooves along their edges and the top of the top most block may be assembled and utilized as described above.

Thus, there has been described a process for making a three dimensional structure, and preferably a building panel or block and panels of a preferred mating configuration to be assembled with a skeletal framework of steel which is embedded in reinforced concrete. This type of structure has been found to have an insulation coefficient of R 4 per inch, responds to compressive forces of up to 900 p.s.i., has a tensile resistance of 800 p.s.i., a sound resistance of 300 Hz, and which weighs less than about 40 pounds per cubic foot.

While these inventions have been described in practical and preferred embodiments, it is recognized that departures may be made within the spirit and scope of these inventions which should, therefore, not be limited except as set forth in the following claims and within the doctrine of equivalents.

What is claimed is:

1. The process of making a lightweight, cementitious three dimensional structure comprising the steps of:

(a) measuring a quantity of water;

(b) measuring a quantity of about 425 kilograms of cement and a quantity of between about 40 to 60 grams ferric chloride in 40% solution by volume per about 278 liters of said water;

(c) mixing said quantity of water, said quantity of cement and said quantity of ferric chloride to form a mixture;

(d) measuring a quantity between about 0.620 kilograms and 1.347 kilograms of aluminum, a quantity between about 0.230 kilograms and 0.710 kilograms of a silicate derivative, a quantity between about 0.560 and 0.680 kilograms of a calcium derivative, and a quantity between about 4 and 8 kilograms of fiber per about 278 liters of water;

(e) combining said mixture of said cement, said ferric chloride and said water with said quantity of aluminum, said quantity of said silicate derivative, and said quantity of said calcium derivative and said fiber;

(f) mixing said combination of said mixture of said cement, said ferric chloride and said water with said quantity of said aluminum, said quantity of said silicate derivative, said quantity of said calcium derivative and said fiber;

(g) waiting until said mixed combination of said mixture of said cement, said ferric chloride and said water with said quantity of aluminum, said quantity of said silicate derivative, said quantity of said calcium derivative and said fiber rises; and (h) forming said lightweight, cementitious, three dimensional structure from said mixed combination of step (g) of said mixture of said cement, said ferric chloride and said water with said quantity of aluminum, said quantity of said silicate derivative, said quantity of said calcium derivative and said fiber subsequent to said mixed combination rising.

2. A process of making a lightweight, cementitious, three dimensional structure as recited in claim 1 wherein said step of measuring said quantity of aluminum includes measuring a quantity of substantially pure, powdered aluminum.

3. A process of making a lightweight, cementitious, three dimensional structure as recited in claim 1 wherein said step of measuring said quantity of said silicate derivative includes measuring a quantity of hexafluorosilicate.

4. A process of making a lightweight, cementitious, three dimensional structure as recited in claim 1 wherein said step of measuring said quantity of said calcium derivative includes measuring a quantity of calcium formate.

5. A process for making a light weight, cementitious, three dimensional structure as recited in claim 1 wherein said step of mixing said quantity of water, said cement and said ferric chloride further includes the step of measuring a quantity of about 5 grams sodium hydroxide per 278 liters of water, and mixing said sodium hydroxide with said quantity of water, said cement and said ferric chloride.

6. A process of making a lightweight, cementitious three dimensional structure comprising the steps of:
   (a) measuring a quantity of water;
   (b) measuring a quantity of about 425 kilograms of cement and between approximately 40 to 60 grams of ferric chloride in 40% solution by volume per approximately 278 liters of said water;
   (c) mixing said quantity of water, said cement and said ferric chloride to form a mixture;
   (d) measuring between approximately 0.620 kilograms and 1.347 kilograms of substantially pure powdered aluminum, between approximately 0.230 kilograms and 0.710 kilograms of hexafluorosilicate, between approximately 0.560 and 0.680 kilograms of calcium formate, and between approximately 4 and 8 kilograms of fiber, per approximately 278 liters of water;
   (e) combining said mixture of said cement, said ferric chloride and said water with said powdered aluminum, said hexafluorosilicate, said calcium formate and said fiber;
   (f) mixing said combination of said mixture of said cement, said ferric chloride and said water with said powdered aluminum, said hexafluorosilicate, said calcium formate and said fiber;
   (g) waiting until said mixed combination of said mixture of said cement, said ferric chloride and said water and said powdered aluminum, said hexafluorosilicate, said calcium formate and said fiber rises; and
   (h) forming said lightweight, cementitious, three dimensional structure from said mixed combination of step (g) of said mixture of said cement, said ferric chloride and said water and said powdered aluminum, said hexafluorosilicate, said calcium formate and said fiber subsequent to said mixed combination rising.

7. A process of making a lightweight, cementitious, three dimensional structure as recited in a claim 6 wherein the step of forming said lightweight, cementitious, three dimensional structure from said raised, mixed combination of said mixture of said cement, said ferric chloride and said water and said powdered aluminum, said hexafluorosilicate, said calcium formate and said fiber further includes pouring said mixed combination of step (g) of said mixture of said cement, said ferric chloride and said water and said powdered aluminum, said hexafluorosilicate, said calcium formate and said fiber subsequent to said mixed combination rising into an extrusion machine so as to extrude said lightweight, cementitious, three dimensional structure.

8. A process of making a lightweight, cementitious, three dimensional structure as recited in a claim 6 wherein the step of waiting until said mixed combination of said mixture of said cement, said ferric chloride and said water and said powdered aluminum, said hexafluorosilicate, said calcium formate and said fiber rises is preceded by the step of pouring said mixed combination of said mixture of said cement, said ferric chloride and said water and said powdered aluminum, said hexafluorosilicate, said calcium formate and said fiber into a mold to approximately 50% capacity of said mold such that upon the step of waiting until said mixed combination of said mixture of said cement, said ferric chloride and said water and said powdered aluminum, said hexafluorosilicate, said calcium formate and said fiber rises said mixed combination of said mixture of said cement, said ferric chloride and said water and said powdered aluminum, said hexafluorosilicate, said calcium formate and said fiber rises to approximately two times its original volume, and said step of forming said lightweight, cementitious, three dimensional structure from said raised, mixed combination of said mixture of said cement, said ferric chloride and said water and said powdered aluminum, said hexafluorosilicate, said calcium formate and said fiber further includes the step of steaming said raised, mixed combination of said mixture of said cement, said ferric chloride and said water and said powdered aluminum, said hexafluorosilicate, said calcium formate and said fiber in said mold until cured.

9. A process of making a lightweight, cementitious, three dimensional structure as recited in claim 6 wherein the step of mixing said combination of said mixture of said cement, said ferric chloride and said water with said powdered aluminum, said hexafluorosilicate, said calcium formate and said fiber further includes mixing for approximately 20 seconds.

10. A process of making a lightweight, cementitious, three dimensional structure as recited in claim 9 wherein the step of mixing said quantity of water, said cement and said ferric chloride further includes mixing in a high speed mixer for approximately one minute.

11. A process of making a lightweight, cementitious three dimensional structure as recited in claim 6 wherein the step of measuring between approximately 4 and 8 kilograms of fiber includes measuring between approximately 4 and 8 kilograms of a synthetic fiber.

12. A process of making a lightweight, cementitious, three dimensional structure as recited in claim 11 wherein the step of measuring between approximately 4 and 8 kilograms of synthetic fiber includes measuring between approximately 4 and 8 kilograms of polypropylene fibers.

13. A process of making a lightweight, cementitious three dimensional structure as recited in claim 6 wherein the step of measuring between approximately 4 and 8 kilograms of said fiber includes measuring between approximately 4 and 8 kilograms of organic fibers.

14. A process of making a lightweight cementitious three dimensional structure as recited in claim 5 wherein the step of measuring between approximately 4 and 8 kilograms of fiber includes measuring between approximately 4 and 8 kilograms of mineral fiber.

15. A process of making a lightweight, cementitious, three dimensional structure as recited in claim 6 wherein the step of forming the lightweight, cementitious, three dimensional structure from said mixed combination of step g) of said mixture of said cement, said ferric chloride and said water with said powdered aluminum, said hexafluorosilicate, said calcium formate and said fiber subsequent to said mixed combination rising further includes the step of adding at least one reinforcing member.

* * * * *